(12) United States Patent
Koh

(10) Patent No.: US 11,922,125 B2
(45) Date of Patent: Mar. 5, 2024

(54) ENSEMBLE LEARNING FOR EXTRACTING SEMANTICS OF DATA IN BUILDING SYSTEMS

(71) Applicant: Mapped Inc., El Segundo, CA (US)

(72) Inventor: Jason Koh, San Diego, CA (US)

(73) Assignee: MAPPED INC., El Segundo, CA (US)

(*) Notice: Subject to any disclaimer, the term of this patent is extended or adjusted under 35 U.S.C. 154(b) by 0 days.

(21) Appl. No.: 18/144,101

(22) Filed: May 5, 2023

(65) Prior Publication Data

US 2023/0359830 A1 Nov. 9, 2023

Related U.S. Application Data

(60) Provisional application No. 63/339,369, filed on May 6, 2022.

(51) Int. Cl.
*G06F 40/30* (2020.01)
(52) U.S. Cl.
CPC .................. *G06F 40/30* (2020.01)
(58) Field of Classification Search
CPC ....................................................... G06F 40/30
USPC .............................................................. 704/9
See application file for complete search history.

(56) References Cited

U.S. PATENT DOCUMENTS

| | | | |
|---|---|---|---|
| 5,663,891 A | 9/1997 | Bamji et al. | |
| 5,729,466 A | 3/1998 | Bamji | |
| 7,606,890 B1 | 10/2009 | Baier et al. | |
| 8,773,437 B1 | 7/2014 | Goldman et al. | |
| 8,819,206 B2 | 8/2014 | Bandi et al. | |
| 9,667,641 B2 | 5/2017 | Muddu et al. | |
| 10,019,536 B2 | 7/2018 | Hong et al. | |
| 10,044,630 B2 | 8/2018 | Kriegesmann et al. | |

(Continued)

FOREIGN PATENT DOCUMENTS

| | | |
|---|---|---|
| WO | WO-9913418 A1 | 3/1999 |
| WO | WO-2020089259 A1 | 5/2020 |

(Continued)

OTHER PUBLICATIONS

Cheong. Four ways to quantify synchrony between time series data. Towards Data Science Available at https://towardsdatascience.com/four-ways-to-quantify-synchrony-between-time-series-data-b99136c4a9c9 (May 13, 2019).

(Continued)

*Primary Examiner* — Susan I McFadden
(74) *Attorney, Agent, or Firm* — WILSON SONSINI GOODRICH & ROSATI

(57) ABSTRACT

Described herein are systems and methods for utilizing ensemble learning methods to extract semantics of data in buildings by retrieving a plurality of data sets from a plurality of data sources associated with an automated environment; labeling a subset of the plurality of data sets by applying Natural Language Processing (NLP) on manufacturer specifications to generate a plurality of labels associated with the subset of the plurality of data sets, respectively; training a learning model on the subset of the plurality of data sets and the plurality of labels; and applying the learning model on remanding subset of the plurality of data sets to generate a semantic map indicative of semantic arrangement of the plurality of data sources associated with the automated environment.

20 Claims, 4 Drawing Sheets

(56) References Cited

U.S. PATENT DOCUMENTS

| | | | |
|---|---|---|---|
| 10,216,706 B1 | 2/2019 | Bonk et al. | |
| 10,353,596 B2 | 7/2019 | Zhou | |
| 10,540,383 B2 | 1/2020 | Cobbett et al. | |
| 10,699,214 B2* | 6/2020 | Chen | G06F 16/9024 |
| 10,901,373 B2 | 1/2021 | Locke et al. | |
| 10,929,777 B2* | 2/2021 | Adjaoute | G06Q 30/0201 |
| 10,997,195 B1 | 5/2021 | Sekar | |
| 11,272,011 B1* | 3/2022 | Laughton | G05B 15/02 |
| 11,455,287 B1 | 9/2022 | Hillion et al. | |
| 11,526,261 B1 | 12/2022 | Leach et al. | |
| 11,556,105 B2 | 1/2023 | Cooley et al. | |
| 11,561,522 B2 | 1/2023 | Cooley et al. | |
| 11,561,523 B2 | 1/2023 | Cooley et al. | |
| 11,573,551 B2 | 2/2023 | Cooley et al. | |
| 11,586,167 B2 | 2/2023 | Cooley et al. | |
| 11,636,234 B2* | 4/2023 | Rejeb Sfar | G06F 30/13 703/1 |
| 2003/0212678 A1 | 11/2003 | Bloom et al. | |
| 2004/0049699 A1 | 3/2004 | Griffith et al. | |
| 2004/0210654 A1 | 10/2004 | Hrastar | |
| 2004/0260518 A1 | 12/2004 | Polz et al. | |
| 2007/0208440 A1 | 9/2007 | Bliss et al. | |
| 2008/0189402 A1 | 8/2008 | Betzler et al. | |
| 2009/0100407 A1 | 4/2009 | Bouillet et al. | |
| 2010/0014432 A1 | 1/2010 | Durfee et al. | |
| 2010/0257535 A1 | 10/2010 | Badovinatz et al. | |
| 2011/0004631 A1 | 1/2011 | Inokuchi et al. | |
| 2011/0087522 A1 | 4/2011 | Beaty et al. | |
| 2011/0179027 A1 | 7/2011 | Das et al. | |
| 2011/0295903 A1 | 12/2011 | Chen | |
| 2012/0084422 A1 | 4/2012 | Bandi et al. | |
| 2012/0158745 A1 | 6/2012 | Gorelik et al. | |
| 2012/0158933 A1 | 6/2012 | Shetty et al. | |
| 2012/0259466 A1 | 10/2012 | Ray et al. | |
| 2012/0321174 A1 | 12/2012 | Tsymbal et al. | |
| 2013/0124465 A1 | 5/2013 | Pingel et al. | |
| 2013/0232123 A1 | 9/2013 | Ahmed et al. | |
| 2014/0122806 A1 | 5/2014 | Lin et al. | |
| 2014/0277604 A1 | 9/2014 | Nixon et al. | |
| 2015/0074078 A1 | 3/2015 | Roche et al. | |
| 2015/0074117 A1 | 3/2015 | Gorelik et al. | |
| 2015/0095770 A1 | 4/2015 | Mani et al. | |
| 2015/0180891 A1 | 6/2015 | Seward et al. | |
| 2015/0256635 A1 | 9/2015 | Casey et al. | |
| 2015/0281105 A1 | 10/2015 | Vaderna et al. | |
| 2016/0019228 A1 | 1/2016 | Hong et al. | |
| 2016/0098037 A1 | 4/2016 | Zornio et al. | |
| 2016/0132538 A1 | 5/2016 | Bliss et al. | |
| 2016/0342707 A1 | 11/2016 | Drobek et al. | |
| 2016/0373481 A1 | 12/2016 | Sultan et al. | |
| 2017/0085438 A1 | 3/2017 | Link et al. | |
| 2017/0154080 A1 | 6/2017 | De Smet et al. | |
| 2017/0154282 A1 | 6/2017 | Rossi et al. | |
| 2017/0168779 A1 | 6/2017 | Sevenich et al. | |
| 2017/0249434 A1 | 8/2017 | Brunner | |
| 2017/0279687 A1 | 9/2017 | Muntés-Mulero et al. | |
| 2017/0286456 A1 | 10/2017 | Wenzel et al. | |
| 2018/0173795 A1 | 6/2018 | Cobbett et al. | |
| 2018/0219888 A1 | 8/2018 | Apostolopoulos | |
| 2018/0219919 A1 | 8/2018 | Crabtree et al. | |
| 2018/0232459 A1 | 8/2018 | Park et al. | |
| 2019/0057064 A1 | 2/2019 | Bonk et al. | |
| 2019/0108197 A1 | 4/2019 | Bonk et al. | |
| 2019/0132145 A1 | 5/2019 | O'Hora | |
| 2019/0133026 A1 | 5/2019 | Seaman et al. | |
| 2019/0158353 A1 | 5/2019 | Johnson et al. | |
| 2019/0187643 A1 | 6/2019 | Carpenter et al. | |
| 2019/0205148 A1 | 7/2019 | Schur et al. | |
| 2019/0220583 A1 | 7/2019 | Douglas et al. | |
| 2019/0324831 A1 | 10/2019 | Gu | |
| 2019/0384238 A1 | 12/2019 | Songkakul | |
| 2020/0004751 A1 | 1/2020 | Stennett et al. | |
| 2020/0280565 A1 | 9/2020 | Rogynskyy et al. | |
| 2020/0296137 A1 | 9/2020 | Crabtree et al. | |
| 2020/0301972 A1 | 9/2020 | Wang et al. | |
| 2020/0313924 A1 | 10/2020 | Park et al. | |
| 2020/0327371 A1 | 10/2020 | Sharma et al. | |
| 2020/0327444 A1 | 10/2020 | Negi et al. | |
| 2020/0379992 A1 | 12/2020 | De Smet | |
| 2020/0394455 A1 | 12/2020 | Lee et al. | |
| 2021/0073216 A1 | 3/2021 | Chang et al. | |
| 2021/0090694 A1 | 3/2021 | Colley et al. | |
| 2021/0097446 A1 | 4/2021 | Kim et al. | |
| 2021/0133670 A1 | 5/2021 | Cella et al. | |
| 2021/0157312 A1 | 5/2021 | Cella et al. | |
| 2021/0157671 A1 | 5/2021 | Shastri et al. | |
| 2021/0273965 A1 | 9/2021 | Pi et al. | |
| 2021/0287459 A1 | 9/2021 | Cella et al. | |
| 2021/0293103 A1 | 9/2021 | Olsen et al. | |
| 2021/0333762 A1 | 10/2021 | Govindaraj et al. | |
| 2022/0138557 A1 | 5/2022 | Rossi et al. | |
| 2022/0147000 A1* | 5/2022 | Cooley | G06F 9/54 |
| 2022/0147008 A1 | 5/2022 | Cooley et al. | |
| 2022/0150124 A1* | 5/2022 | Cooley | G06F 21/6218 |
| 2022/0156433 A1 | 5/2022 | Laane et al. | |
| 2022/0214170 A1* | 7/2022 | Singh | G01C 21/3811 |
| 2023/0004548 A1 | 1/2023 | Papakonstantinou et al. | |

FOREIGN PATENT DOCUMENTS

| | | |
|---|---|---|
| WO | WO-2022059588 A1 | 3/2022 |
| WO | WO-2022103812 A1 | 5/2022 |
| WO | WO-2022103813 A1 | 5/2022 |
| WO | WO-2022103820 A1 | 5/2022 |
| WO | WO-2022103822 A1 | 5/2022 |
| WO | WO-2022103824 A1 | 5/2022 |
| WO | WO-2022103829 A1 | 5/2022 |
| WO | WO-2022103831 A1 | 5/2022 |

OTHER PUBLICATIONS

George et al. Big data and management. Academy of management Journal 57(2):321-326 (2014). Retrieved on Jan. 8, 2022 from https://journals.aom.org/doi/abs/10.5465/amj.2014.4002?journalCode=amj.

Grady et al. Robust classification of salient links in complex networks. Nat Commun 3:864 (May 29, 2012).

Kind et al.: Relationship Discovery with NetFlow to Enable Business-Driven IT Management. IEEE Xplore, Conference: Business-Driven IT Management, 2006, pp. 63-70 DOI:10.1109/BDIM.2006.1649212 (2006).

PCT/US2021/058748 International Search Report and Written Opinion dated Feb. 9, 2022.

PCT/US2021/058749 International Search Report and Written Opinion dated Dec. 22, 2021.

PCT/US2021/058756 International Search Report and Written Opinion dated Jan. 11, 2022.

PCT/US2021/058759 International Search Report and Written Opinion dated Dec. 22, 2021.

PCT/US2021/058762 International Search Report and Written Opinion dated Dec. 23, 2021.

PCT/US2021/058768 International Search Report and Written Opinion dated Jan. 24, 2022.

PCT/US2021/058771 International Search Report and Written Opinion dated Jan. 11, 2022.

U.S. Appl. No. 17/372,238 Final Office Action dated Apr. 19, 2022.
U.S. Appl. No. 17/372,238 Non-Final Office Action dated Jan. 19, 2022.
U.S. Appl. No. 17/372,242 Final Office Action dated Mar. 4, 2022.
U.S. Appl. No. 17/372,247 Final Office Action dated Apr. 26, 2022.
U.S. Appl. No. 17/372,247 Final Office Action dated Mar. 30, 2023.
U.S. Appl. No. 17/372,247 Non-Final Office Action dated Dec. 13, 2021.
U.S. Appl. No. 17/372,247 Non-Final Office Action dated Nov. 14, 2022.
U.S. Appl. No. 17/372,251 Final Office Action dated Feb. 22, 2022.
U.S. Appl. No. 17/372,256 Final Office Action dated Feb. 18, 2022.
U.S. Appl. No. 17/372,267 Final Office Action dated Oct. 24, 2022.
U.S. Appl. No. 17/372,267 Final Office Action dated Feb. 9, 2022.

(56) References Cited

OTHER PUBLICATIONS

U.S. Appl. No. 17/372,267 Non-Final Office Action dated Jul. 21, 2022.
U.S. Appl. No. 17/372,267 Non-Final Office Action dated Mar. 28, 2023.
U.S. Appl. No. 17/372,275 Final Office Action dated Mar. 4, 2022.
U.S. Appl. No. 17/372,251 Office Action dated Nov. 5, 2021.
U.S. Appl. No. 17/372,267 Office Action dated Oct. 26, 2021.
U.S. Appl. No. 17/372,242 Office Action dated Nov. 15, 2021.
U.S. Appl. No. 17/372,256 Office Action dated Oct. 29, 2021.
U.S. Appl. No. 17/372,275 Office Action dated Nov. 10, 2021.
Abualdenien et al. Ensemble-learning approach for the classification of Levels of Geometry (LOG) of building elements. Advanced Engineering Informatics 51:101497 (2022).
PCT/US2023/066693 International Search Report and Written Opinion dated Sep. 25, 2023.
Marcisak, Correlating inferred data plane IPv6 reboot events with control plane BGP activity (Doctoral dissertation, Monterey, California: Naval Postgraduate School) (2016).
U.S. Appl. No. 17/372,247 Notice of Allowance dated Nov. 7, 2023.
U.S. Appl. No. 17/372,267 Notice of Allowance dated Dec. 20, 2023.

\* cited by examiner

ENSEMBLE LEARNING FOR EXTRACTING SEMANTICS OF DATA IN BUILDING SYSTEMS

CROSS-REFERENCE TO RELATED APPLICATIONS

This application claims the priority and benefit of U.S. Provisional Application No. 63/339,369, filed May 6, 2022, and entitled: ENSEMBLE LEARNING FOR EXTRACTING SEMANTICS OF DATA IN BUILDING SYSTEMS, the content of which is incorporated herein by reference in its entirety.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, be able to provide analytics and visualization of the smart office or smart home, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

The present subject matter aims to ensemble heterogeneous data sources and machine learning methods for extracting the semantics of data in buildings. Ensemble methods are adopted to avoid the difficulties in developing a single oracle machine learning model for covering all the patterns in buildings for the use case. In some embodiments, ensemble methods are adopted to extract the semantics of data in buildings. The ensemble methods may be able to recognize a large variety of different types of data that might be present in the data collected by the IoT devices in a building.

Smart buildings have much potential to improve energy efficiency and the quality of life by applying computation logic to the systems. In order to apply computation logic (e.g., computer programs) to the systems in a smart building, it is necessary to understand the semantics of data that is being collected by the building's sensors. This includes understanding the type of sensors that are being used (e.g., temperature sensors, humidity sensors, etc.) and the location of the sensors within the building (e.g., in Room 101). Knowing this information is important because it allows the computer programs that are being used to control the building's systems to make sense of the data that is being collected and to use it in a meaningful way. For example, if a program knows that a particular sensor is a temperature sensor and that it is located in a particular room, it can use the data from that sensor to control the heating or cooling in that room to maintain a comfortable temperature.

However, the representation of such semantics is not standardized in existing systems. Existing systems often encode such information in a human readable text, which is often not standardized. Often, only domain experts can understand the information, and it is difficult for other people or systems to make sense of the information. As a result, modernizing existing buildings (i.e., updating them to be smarter and more efficient) often requires a lot of manual effort, as domain experts have to read through and map the information into standard vocabularies (i.e., sets of terms and definitions). This process can be time-consuming and resource-intensive, especially in medium or large-sized buildings where there are tens of thousands of sensor names to process. By way of non-limiting example, assume that there is a sensor, whose name is "VMA-101.ZNT." It means that it is a "Zone Temperature Sensor" associated with a controller called "VMA-101." There are tens of thousands of such names in a medium-sized building, and it takes a large amount of resources to manually normalize them. As described, this naming conventions (i.e., the way that sensor names are constructed and organized) often vary from building to building, which means that a machine learning model that is trained to understand the semantics of data in one building may not be able to be used in a different building without significant modification. Additionally, other types of representations of such semantics may further add the complexity of designing a machine learning model, for example, the representations may comprise floor-plan drawings, mechanical drawings, Battery Management System (BMS) configuration, etc. For example, if a smart building has a complex floor plan with many different rooms and systems, and the data being collected includes floor-plan drawings and mechanical drawings, it can be difficult to develop a machine learning model that is able to make sense of this data and use it to control the systems in the building. Similarly, if the data being collected includes BMS configuration information, it may be challenging to develop a machine learning model that is able to use this data to control the systems in the building in an effective way. This can make it difficult to develop machine learning models that are able to work with data from a variety of different buildings.

There also exists a challenge to design a single holistic model that can accommodate different types of data (e.g., lookup table, unstructured text metadata, and time-series data). A holistic model should have a complex architecture to embed various patterns into a single model, which makes the development process, including design, fitting, and debugging, convoluted. It can be difficult to design a single, holistic model that is able to handle all the different types of data that might be encountered. This is because such a model would need to have a complex architecture in order to be able to incorporate all the different types of patterns that might be present in the data. Instead, the subject matter described herein utilizes simpler specialized models (i.e., base classifiers), specialized for certain types of data sets and patterns, within an ensemble framework. Individual base classifiers are easier to develop while an ensemble framework fully utilizes the base classifiers to infer semantics of the data in target buildings. The advantage of this approach is that it can be easier to develop individual base classifiers, since they are each designed to handle a specific type of data. Furthermore, the ensemble framework can help to fully utilize the capabilities of the base classifiers, allowing them to work together to infer the semantics (meaning) of the data in a target building.

The system and method described herein may utilize different types of models across a variety of data types. Semantics can be observed in various data types, mainly textual metadata and time series data of individual sensors. Different data types are complementary, and so are the models trained from the different data types. The semantics (i.e., meaning) of the data can be found in different types of data, including textual metadata (e.g., descriptions or labels of the data) and time series data (e.g., measurements of a sensor over time). Different types of data may provide complementary information about the semantics of the data, and using models trained on different types of data may provide a more complete understanding of the semantics of the IoT devices and the relationships among them. For example, a model trained on time series data might be able to identify patterns in the data that are related to certain semantic concepts, while a model trained on textual metadata might be able to extract meaning from descriptions or labels of the data. By combining the insights from multiple models, the system may advantageously provide a more complete understanding of the semantics of the data, and hence generate a comprehensive semantic arrangement/map.

Accordingly, in one aspect, are computer-implemented methods comprising: retrieving a plurality of data sets from a plurality of data sources associated with an automated environment, wherein the plurality of data sets comprises a plurality of metadata; selecting one or more base classifiers from a plurality of base classifiers based at least in part on a similarity level between metadata associated with the one or more base classifiers and the plurality of metadata associated with the plurality of data set, wherein the plurality of base classifiers has been trained on training examples comprises (i) a plurality of data sets from a plurality of data sources associated with a second automated environment other than said automated environment, and (ii) a label that indicates a semantic arrangement associated with each of the plurality of data sources associated with the second automated environment; ensembling the one or more base classifiers by an ensembling model to generate a learning model, wherein the ensembling model assigns one or more weights to the one or more base classifiers based at least in part on the similarity level; and applying the ensembled learning model to the automated environment to generate a semantic map indicative of semantic arrangement of the plurality of data sources associated with the automated environment. In some embodiments, ensembling the one or more base classifiers further comprises: utilizing a Multi-Layer Perceptron (MLP) model to identify quality level of the plurality of data sets; and assigning one or more weights to the one or more base classifies based at least in part on the similarity level and the quality level. In various embodiments, the automated environment comprises a building, a warehouse, a factory, or a campus. In some embodiments, the plurality of data sources comprises Internet of Things (IoT) devices. In some embodiments, selecting one or more base classifiers further comprises training a gating model on training examples comprise (i) a plurality of data sets comprises a first set of metadata, (ii) a label that indicates which one or more base classifiers are selected for the data sets; and applying the gating model to the plurality of data sets to select the one or more base classifiers. In some embodiments, ensembling the one or more base classifiers further comprises utilizing a linear function to ensemble the selected one or more base classifiers. In some embodiments, the training examples for the base classifiers further comprise NLP-generated semantic maps. In some embodiments, the similarity level comprises a string similarity. In some embodiments, the training examples are normalized prior to feed to the base classifiers. In some embodiments, the base classifiers are trained on training examples associated with different types of automated environments.

Also described herein, in certain embodiments, are systems comprising at least one computing device comprising at least one processor, a memory, and instructions executable by the at least one processor to create an application comprising a data retrieving module configured to retrieve a plurality of data sets from a plurality of data sources associated with an automated environment, wherein the plurality of data sets comprises a plurality of metadata; a base classifiers selection module configured to select one or more base classifiers from a plurality of base classifiers based at least in part on a similarity level between metadata associated with the one or more base classifiers and the plurality of metadata associated with the plurality of data set, wherein the plurality of base classifiers has been trained on training examples comprises (i) a plurality of data sets from a plurality of data sources associated with a second automated environment other than said automated environment, and (ii) a label that indicates a semantic arrangement associated with each of the plurality of data sources associated with the second automated environment; a model ensemble module configured to ensemble the one or more base classifiers by an ensembling model to generate a learning model, wherein the ensembling model assigns one or more weights to the one or more base classifiers based at least in part on the similarity level; and a semantic generation module configured to apply the ensembled learning model to the automated environment to generate a semantic map indicative of semantic arrangement of the plurality of data sources associated with the automated environment.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
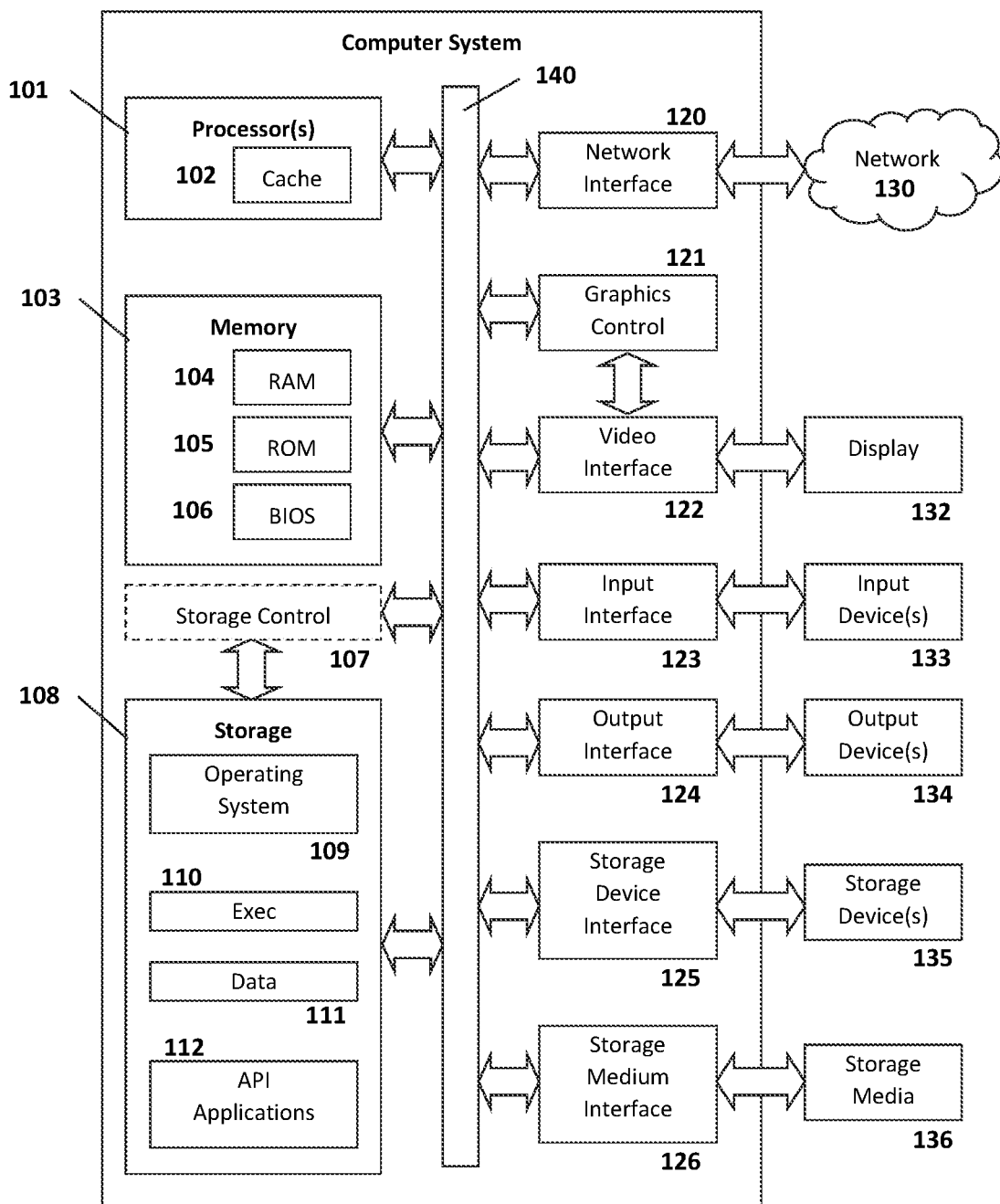
FIG. 1 shows a non-limiting example of a computing device; in this case, a device with one or more processors, memory, storage, and a network interface.

Described herein, in certain embodiments, are computer-implemented methods comprising: retrieving a plurality of data sets from a plurality of data sources associated with an automated environment, wherein the plurality of data sets comprises a plurality of metadata; selecting one or more base classifiers from a plurality of base classifiers based at least in part on a similarity level between metadata associated with the one or more base classifiers and the plurality of metadata associated with the plurality of data set, wherein the plurality of base classifiers has been trained on training examples comprises (i) a plurality of data sets from a plurality of data sources associated with a second automated environment other than said automated environment, and (ii) a label that indicates a semantic arrangement associated with each of the plurality of data sources associated with the second automated environment; ensembling the one or more base classifiers by an ensembling model to generate a learning model, wherein the ensembling model assigns one or more weights to the one or more base classifiers based at least in part on the similarity level; and applying the ensembled learning model to the automated environment to generate a semantic map indicative of semantic arrangement of the plurality of data sources associated with the automated environment. In some embodiments, ensembling the one or more base classifiers further comprises: utilizing a Multi-Layer Perceptron (MLP) model to identify quality level of the plurality of data sets; and assigning one or more weights to the one or more base classifies based at least in part on the similarity level and the quality level. In various embodiments, the automated environment comprises a building, a warehouse, a factory, or a campus. In some embodiments, the plurality of data sources comprises Internet of Things (IoT) devices. In some embodiments, selecting one or more base classifiers further comprises training a gating model on training examples comprise (i) a plurality of data sets comprises a first set of metadata, (ii) a label that indicates which one or more base classifiers are selected for the data sets; and applying the gating model to the plurality of data sets to select the one or more base classifiers. In some embodiments, ensembling the one or more base classifiers further comprises utilizing a linear function to ensemble the selected one or more base classifiers. In some embodiments, the training examples for the base classifiers further comprise NLP-generated semantic maps. In some embodiments, the similarity level comprises a string similarity. In some embodiments, the training examples are normalized prior to feed to the base classifiers. In some embodiments, the base classifiers are trained on training examples associated with different types of automated environments.

Also described herein, in certain embodiments, are systems comprising at least one computing device comprising at least one processor, a memory, and instructions executable by the at least one processor to create an application comprising a data retrieving module configured to retrieve a plurality of data sets from a plurality of data sources associated with an automated environment, wherein the plurality of data sets comprises a plurality of metadata; a base classifiers selection module configured to select one or more base classifiers from a plurality of base classifiers based at least in part on a similarity level between metadata associated with the one or more base classifiers and the plurality of metadata associated with the plurality of data set, wherein the plurality of base classifiers has been trained on training examples comprises (i) a plurality of data sets from a plurality of data sources associated with a second automated environment other than said automated environment, and (ii) a label that indicates a semantic arrangement associated with each of the plurality of data sources associated with the second automated environment; a model ensemble module configured to ensemble the one or more base classifiers by an ensembling model to generate a learning model, wherein the ensembling model assigns one or more weights to the one or more base classifiers based at least in part on the similarity level; and a semantic generation module configured to apply the ensembled learning model to the automated environment to generate a semantic map indicative of semantic arrangement of the plurality of data sources associated with the automated environment.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, Ethernet, IP, serial buses, and/or other forms of communication between two or more IoT devices.

As used herein, "machine learning (ML) model type" refers a specific mathematical framework to be trained to make predictions or decisions. Example ML model types are gradient boosting, neural networks, and variants thereof. Some further examples of ML models may comprise:

Supervised learning models: These models are trained on labeled data, which means that the data includes both input examples and corresponding correct output values. Examples of supervised learning models include decision trees, support vector machines, and logistic regression.

Unsupervised learning models: These models are trained on unlabeled data, which means that the data includes input examples but no corresponding output values. Unsupervised learning models are used to discover patterns and relationships in the data. Examples of unsupervised learning models include clustering algorithms and deep belief networks.

Semi-supervised learning models: These models are trained on a mix of labeled and unlabeled data. They can be useful in situations where it is difficult or expensive to obtain a large amount of labeled data. Examples of semi-supervised learning models include graph-based algorithms and self-training algorithms.

Reinforcement learning models: These models are trained to take actions in an environment in order to maximize a reward signal. They are commonly used in applications like robot control and game playing. Examples of reinforcement learning models include Q-learning algorithms and Markov decision processes.

As used herein, "machine learning (ML) model" refers to an instance of a specific ML model type trained over a set of training data. This can perform predictions and make decisions. Examples of some other functions that ML model may provide in connection with the subject matter described herein may comprise:

Automated device discovery: ML model can be used to scan a network and automatically discover and identify IoT devices that are connected to it. This can create an accurate map of the devices on the network and make it easier to manage the device.

Location tracking: ML model can be used to track the location of IoT devices in real-time, either by using GPS or by analyzing the signal strength of the device's connection to the network. This can be used for applications like asset tracking or location-based services.

Network optimization: ML model can be used to analyze the performance of an IoT network and identify ways to optimize it, such as by identifying bottlenecks or identifying devices that are consuming a disproportionate amount of bandwidth, and/or energy.

Predictive maintenance: ML model can be used to analyze data from IoT devices to predict when they are likely to fail or need maintenance. This can help to prevent disruptions and improve the overall reliability of the network.

Generate semantic map: ML model can be used to collect data from IoT devices and generate semantic map accordingly. The ML model may generate the semantic map by applying it to the data collected by the IoT devices. The output of the model will be a representation of the semantics of the data, which can be displayed as a map or in some other format. The resulting map could be used, for example, to visualize the distribution of different types of devices within a building or to identify patterns in the data that may be used to optimize the performance of the devices or the overall system.

As used herein, "semantic map," and/or "semantic arrangement" refers to a representation of the meaning or interpretation of data that is collected by the devices, or a visual representation of the semantics of data in a building. It can be used to show the relationships between different types of data, such as which sensors are connected to which systems, and where those sensors are located within the building. The semantic map can be used to understand the data being collected by the building's sensors and to use it in a meaningful way to control the systems in the building, such as the heating and cooling systems. The use of a semantic map can help to improve energy efficiency and the quality of life. A semantic map may provide rich information to downstream optimization and provide actionable insights.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Overview

This disclosure proposes a framework to ensemble various data sets and models altogether to extract semantics of the data. Each data set or model may be specialized for the patterns that it represents, and each of them alone may be able to generalize for a portion of a new target building. As described herein elsewhere, each data set or model on its own may not be able to be applicable to new target buildings to generate a full set of semantic arrangements of the IoT devices in the buildings. In some embodiments, an ensemble learning (i.e., ensemble modeling) may be utilized to combine the predictions of multiple machine learning models to extract the semantics (meaning) of data from various sources. For example, multiple data sets and models that are each specialized for certain patterns or types of data may be utilized and combined within a common framework in order to improve the overall performance of the system. In some embodiments, the ensemble method may utilize a priority-based selector. For example, to ensemble multiple base classifiers, a priority-based selector might be used to choose the base classifier(s) with the highest priority (e.g., the one that is most likely to produce the correct result) for a given input, and/or with a priority that is above a threshold. In some embodiments, the ensemble method may comprise a trainable ML model such as a Multi-Layer Perceptron (MLP) and/or a form of Deep Neural Network (DNN). In various embodiments, the following components are utilized to implement the subject matter described herein:

A set of base classifiers for ensemble learning;
  Dictionary lookup;
  Pretrained models from other buildings (e.g., source buildings);
  Models trained with a partially labeled data set for the target building; and
  Models trained with different data sources (time-series, metadata, etc.); and
Ensemble models.

A base classifier is a classifier (i.e., a machine learning model that is used to make predictions about a particular type of data) trained on a specific set of training data. The complexity of the model structure can vary, with some base classifiers having relatively simple models and others having more complex models such as deep neural networks. The choice of model structure will depend on the nature of the data and the specific goals of the task at hand. Because a base classifier is trained on a specific set of training data, it may be specialized in the patterns that are observed in that data. This can make it more effective at making predictions about similar types of data. To take advantage of multiple base classifiers, an ensemble of base classifiers can be used, in which each base classifier is trained on a different set of data and the predictions of the base classifiers are combined in a manner (such as through a weighted average) to make the final prediction. This can help to improve the overall accuracy of the model, as the different base classifiers can complement each other's strengths and weaknesses. In some embodiments, the types of base classifiers can be utilized for ensemble learning for extracting semantics for building systems may comprise the set described below, though an actual implementation is not limited to this set:

Look up known dictionaries such as manufacturer specifications: In some embodiments, the base classifiers may utilize (e.g., be trained on) known dictionaries of terms and definitions. In some embodiments, these known dictionaries of terms and definitions may be published documentations generated by controller manufacturers. In some embodiments, the base classifiers may utilize natural language processing (NLP) models. For example, controller manufacturers such as, by way of non-limiting examples, Carrier and Honeywell publish documentation recommending naming conventions of data points. For example, in a Carrier equipment operation manual, sa\_temp means Supply Air Temperature, and the base classifier may infer the semantics of the same name occurring in a target building. In some embodiments, the dictionaries provide an initial set of insights for understanding the semantics of the data, such as the actual usage of the data points in a given building.

In some embodiments, the implementation of the dictionary look-up technique (i.e., construction of the base classifier) can take various forms, such as using natural language processing (NLP) models or sets of regular expressions. Often, it is a simple and error-resistant approach to use exact matching to the dictionary, which involves looking for an exact match between the name of a data point and a term in the dictionary.

Figure 3:
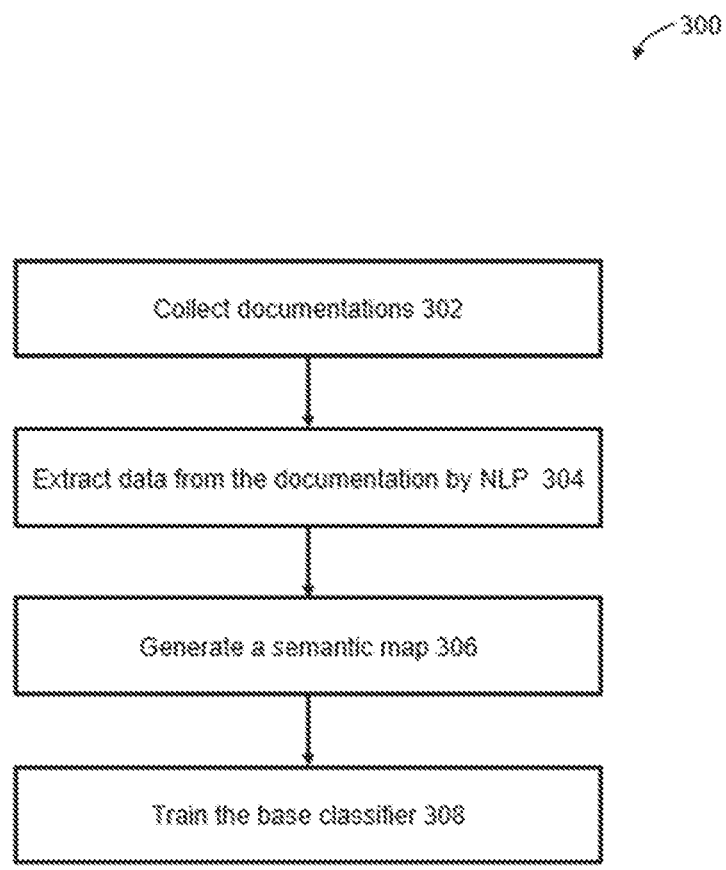
FIG. 3 shows a non-limiting example of a process for training a base classifier, in accordance with embodiments described herein.

In some embodiments, the base classifier may be trained by training examples indicative of the semantic map generated by NLP techniques. FIG. 3 shows a non-limiting example of a process 300 for training a base classifier by NLP generated semantic maps. The process 300 may begin with operation 302, wherein the system may collect documentations, manuals, or handbooks. For example, the system may identify the maker or manufacturers for one or more IoT devices, and scrape or search the internet for relevant documentations or handbooks. In some other examples, the system may access manufacturer databases and the system may be configured to access these databases and extract the relevant documents. If the documentation or handbooks are only available in physical form (e.g., as hard copies or PDFs), the system could be trained to process these documents by using optical character recognition (OCR) techniques to extract the text and other information from the documents. In some embodiments, the system may access manufacturers' API to extract the relevant documents.

Next, the process 300 may proceed to operation 304, wherein the system may extract data from the documentations by NLP. NLP model may deal with the interaction between computers and human (natural) language, and comprise a range of techniques for analyzing and understanding text. In some embodiments the NLP may process the text and extract the relevant information. In some embodiments, based on at least in part on the data structure of the documentations, one or more types of NLP techniques, or combinations thereof, may be selected to extract data from the documentations. For example, if information regarding the names and functions of different devices or data points in an IoT system is of interest, the system may use named entity recognition (NER) techniques to identify and classify named entities in the text. Alternatively or additionally, if the system is attempting to extract general information regarding the overall structure and content of the documentation (e.g., which pages of the documentation may contain the content of interest), techniques like part-of-speech tagging or sentence parsing may be selected and utilized to analyze the syntax and semantics of the text. In some embodiments, the NLP may extract the names and definitions of different data points (i.e., what information does the IoT device provide, the location of the IoT device, individual pieces of data collected by sensors, etc.).

Next, the process 300 may proceed to operation 306, wherein the system may generate a semantic map. In some embodiments, the NLP-extracted information may be standardized into a format that may facilitate the generation of the semantic map. In some embodiments, this process may involve creating a database or other data structure that maps the names of the devices or data points to their definitions or functions. For example, standardized data may be in a format of database of a structured data structure, a graphical representation, and/or a list or table. A database of a structured data structure, in some embodiments, may be a table with columns for the name of each device or data point, its function or definition, and any other relevant information (e.g., the type of device, its location, etc.). Subsequently, database queries or other tools may be utilized to extract the necessary information from the database in order to create the semantic map. A graphical representation, in some embodiments, may be a graph of the data and their relationships. In some embodiments, tools like network diagrams or mind maps may be utilized to create a visual representation of the data and its meaning. For example, nodes may represent the IoT devices and data points, and edges to represent relationships between them (e.g., a device that controls another device). A list or table, in some embodiments, may display the information in a tabular format. For example, it may be in a format of a table with columns for the name of each device or data point, its function or definition, and any other relevant information.

Once the NLP-extracted information is organized in a suitable format, the semantic map may be generated. In some embodiments, visualization tools may be utilized to create a graphical representation of the data and its relationships, or simply displaying the information in a tabular or list format. The resulting map could be used, for example, to visualize the distribution of different types of devices within a building or to identify patterns in the data that might be useful for optimizing the performance of the devices or the overall system. In some embodiments, the generated semantic map may be in a graph data structure, wherein each node (vertex) represents a IoT device, and the edges (i.e., links) between them represents the relationship between the connected nodes. For example, consider a smart building with a number of temperature sensors. Each temperature sensor might be represented as a node in the graph database, and the edges between the nodes might represent the relationships between the sensors (e.g., one sensor might be connected to another sensor because they are located in the same room, or because they are both part of the same HVAC system). By using a graph database to represent the relationships between the sensors, it is possible to more easily understand the data that is being collected by the sensors and to use that data to control the systems in the building.

Next, the process 300 may proceed to operation 308, wherein the generated semantic map(s) may be used to train the base classifier. In some embodiments, to use the semantic map to train a base classifier, the system may prepare the data in a form that can be used to train the model. This might involve extracting the relevant information from the semantic map and organizing it into a dataset that can be used to train the classifier. For example, if the system aims to predict the energy consumption of different devices in a building, then the data points that relate to energy consumption is selected and organized into a dataset with columns for the name of the device, its location, its type, and any other relevant information. Next, the system may label the data for a supervised learning approach to train the base classifier. For example, if the system aims to predict energy consumption, each data point may be labeled with the actual energy consumption of the corresponding device. Next, the data may be slipped into training and test sets. Splitting the data into a training set and a test set may provide the benefit of evaluating the performance of the model. The training set may be used to train the model, while the test set may be used to evaluate the model's performance on unseen data. The base classifier may be further improved by constant training. In some embodiments, the base classifier that is trained by NLP generated semantic maps may provide the functions of prediction and classification of the data sources that is similar to.

ML models trained for labeled source buildings: While generalizing an ML model for any buildings is very difficult, it is more practical to develop a model that works accurately on a specific building or a set of buildings. By training the model on a specific set of buildings, a base classifier that is specialized for those buildings and may be more accurate when applied to them is created. The trained model can function as a base classifier along with other base classifiers.

In this model, it is possible to curate the set of labeled buildings for training. The goal of curation may comprise customizing the base model (i.e., base classifier) for target buildings. In some embodiments, selection metrics to ensemble the base classifiers may be based on similarities of the metadata between labeled buildings and a target building while various types of similarities can be used such string similarities (e.g., edit distance) or embeddings of the metadata (doc2vec, Le and Mikolov "Distributed Representations of Sentences and Documents," PMLR 2014).

Figure 4:
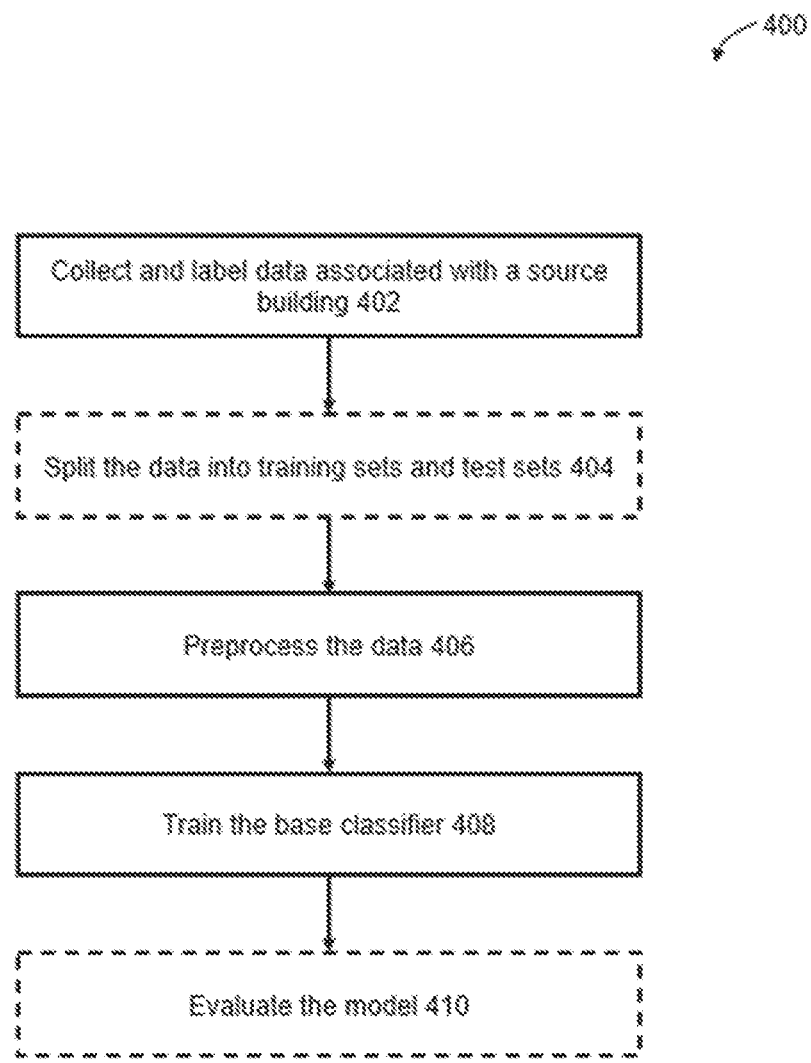
FIG. 4 shows a non-limiting example of a process for training a base classifier, in accordance with embodiments described herein.

In some embodiments, the base classifier may be trained by training examples indicative of a set of source buildings. FIG. 4 shows a non-limiting example of a process 400 for training a base classifier by training examples from a source building. The process 400 may begin with operation 402, wherein the system may collect, and label data associated with a source building. In some embodiments, the system may collect data from the building or buildings that is of interest, i.e., the system may intend to create the model for these buildings. The system may connect with and collect data from sensors or other devices regarding various aspects of the building (e.g., energy consumption, temperature, humidity, etc.), or collect data from existing systems or databases. The collected data is labeled with the correct output for each input for subsequent use in a supervised learning approach.

Next, optionally, the process 400 may proceed to operation 404, wherein the system may split the labeled data into training sets and test sets. In some embodiments, the training set may be used to train the model, while the test set may be used to evaluate the model's performance on unseen data. In some embodiments, the operation 404 is omitted, and the system can still train the base classifier.

Next, the process 400 may proceed to operation 406, wherein the system may preprocess the training set. Depending on the specific characteristics of the data and the requirements of the model, the system may preprocess the data in order to make it suitable for training the model. For example, the system may utilize techniques like scaling or normalization to adjust the range of the data, or feature engineering to extract relevant features from the data. In some embodiments, scaling or normalization may transform an unsuitable training set into a suitable training set. For example, if the range of the data is very large (e.g., 1-1000), it can sometimes be helpful to scale or normalize the data in order to make it more suitable for training the model, for example, adjusting the range of the data so that it falls within a specific range (e.g., 0-1). Additionally, or alternatively, normalization technique may be utilized to adjust the mean and standard deviation of the data so that it has a mean of 0 and a standard deviation of 1. In some embodiments, feature engineering of the training data sets may facilitate extraction of the relevant from the data that can be used to train the model. For example, the system may perform operations such as selecting a subset of the available features, creating new features by combining or manipulating existing ones, or transforming the data in a pre-defined manner (e.g., applying a mathematical function) in order to extract meaningful features. Example of feature engineering techniques may comprise:

Selecting a subset of features: Depending on the nature of the data, the system may select a subset of the available features to use as inputs to the model. For example, if the intended base classier is to predict and provide insights of a building's energy consumption, the features such as the type of device, its location, and its operating hours may be selected to be the relevant features to include in the model.

Creating new features: In some embodiments, the system may create new features by combining or manipulating existing ones. For example, the system may create a new feature that represents the total energy consumption of a device over a given period of time by summing the energy consumption data for that device over the relevant time period.

Transforming the data: In some embodiments, the system may transform the data in a pre-defined manner in order to extract meaningful features. For example, the system may apply a mathematical function (e.g., a log transformation) to the data in order to adjust the range or distribution of the data in a way that makes it more suitable for training the model.

Next, the process may proceed to operation 408, wherein the system may train the base classifier with the training sets. In some embodiments, the system may utilize a supervised learning approach, in which the model is trained on a labeled dataset (i.e., a dataset that includes examples of the correct output for each input) in order to learn the relationships between the inputs and the outputs. In some embodiments, based on the specific goal and/or the data structure of the training data, the system may choose a model type. For example, the model types may comprise linear models, decision trees, neural networks. If the specific goal is classification (i.e., classifying data into one of several pre-defined categories), in some embodiments, the system may choose a model like a decision tree, a random forest, a support vector machine (SVM), or a neural network. In another example, if the goal is to predict a continuous numerical output based on a set of inputs, the system may choose a model like a linear regression, a decision tree, or a neural network. In some embodiments, if the goal to group data into clusters, then the system may choose a model like a k-means clustering algorithm or a density-based clustering algorithm.

Alternatively or additionally, the system may select a loss function when training the base classifier. In some embodiments, a loss function may serve the function of quality control. For example, the model may use a loss function to measure the difference between the predicted output and the true output. In some embodiments, the loss function will be used to guide the model's training process by indicating how far the model's predictions are from the true outputs. In some embodiments, an optimizer is selected to adjust the model's parameters in order to minimize the loss.

Next, the system may feed the training sets (e.g., the inputs and outputs) to train the model on the labeled dataset. During the training process, the loss function and optimizer may be utilized to adjust the model's parameters in order to minimize the loss.

Next, the process 400 may proceed to an optional operation 410, wherein the system may evaluate the trained base classifier. In some embodiment, the system may evaluate the base classifier's performance by feeding the test sets into the model, and assess the performance accordingly. Various techniques may be utilized to evaluate the base classifier. For example, depending on the goal of the base classifier, regression metrics, classification metrics, and/or clustering metrics may be utilized to evaluate the performance of the trained base classifier. The base classifier may be further improved by constant training.

In some embodiments, the base classifier that is trained by data associated with source buildings may provide accurate predication to a target building that is similar to the source building. In some embodiments, the system may utilize selection metrics to identify buildings that are similar to a target building based particularly on the similarities between metadata of the source building and target building. In some embodiments, the system may utilize an edit distance, which is a measure of the similarity between two strings, and it takes into account the number of insertions, deletions, and substitutions required to transform one string into the other. By comparing the metadata of the labeled buildings to the metadata of the target building using edit distance or a similar measure, the system may identify labeled buildings that are similar to the target building in terms of the metadata they contain.

Alternatively or additionally, the system may use embedding techniques like doc2vec to create vector representations of the metadata and compare the vectors using a distance measure. Embedding techniques create a vector representation of a piece of text (e.g., a document or a sentence) that captures the meaning of the text in a way that can be used for various natural language processing tasks. By creating vector representations of the metadata and comparing the vectors using a distance measure, the system may identify labeled buildings that are similar to the target building in terms of the meaning of their metadata.

ML models trained for partially labeled target buildings: when a target building is partially labeled, a model trained over the target building can make partial but accurate predictions. In some embodiments, the target building may be partially labeled by a ML model and/or other techniques. For example, a semi-supervised learning, a self-training model, or a multi-view learning may be utilized to make predictions on the unlabeled data. In some embodiments, a semi-supervised learning, in which the model is trained on both labeled and unlabeled data may be utilized. The model can learn from the labeled data as it would in a supervised learning setting, and can also use the unlabeled data to learn about the underlying structure of the data. In some embodiments, a self-training, in which the model is first trained on the labeled data, and then used to make predictions on the unlabeled data may be utilized. The predictions are treated as "pseudo-labels," and the model is then re-trained using both the original labeled data and the pseudo-labeled data. This process can be repeated until the model's performance converges or until a satisfactory level of performance is achieved. In some embodiments, the system may generate base classifiers from the datasets of the partially labeled target buildings once the prediction is completed. These base classifiers may be adjusted and evaluated prior to any/or during the use for other target buildings.

Various ML model types for different types of data: Semantics can be observed in various data types, mainly textual metadata and time series data of individual sensors. Different data types are complementary, and so are the models trained from the different data types. The semantics (i.e., meaning) of the data can be found in different types of data, including textual metadata (e.g., descriptions or labels of the data) and time series data (e.g., measurements of a sensor over time). Different types of data may provide complementary information about the semantics of the data, and using models trained on different types of data may provide a more complete understanding of the semantics of the IoT devices and the relationships among them. For example, a model trained on time series data might be able to identify patterns in the data that are related to certain semantic concepts, while a model trained on textual metadata might be able to extract meaning from descriptions or labels of the data. In another example, a model trained on floorplan drawings might be able to identify the physical location of the IoT devices in the building, while a model trained on BMS configuration data might be able to identify the functional relationships between the IoT devices. Combining the predictions of these different models can provide a more complete understanding of the semantics of the data and allow for more effective control of the systems in the building.

Ensemble Model

The trained base classifiers are integrated in accordance with an ensemble method. There are various ensemble methods such as utilizing a priority-based selector. For example, to ensemble multiple base classifiers, a priority-based selector might be used to choose the base classifier(s) with the highest priority (e.g., the one that is most likely to produce the correct result) for a given input, and/or with a priority that is above a threshold.

In some embodiments, the ensemble model may be a trainable ML model, such as Bagging algorithms, Boosting algorithms, Stacking algorithms, and Mixture of Experts (ME) algorithms. Bagging is a type of ensemble method in which a model is trained on multiple bootstrapped versions of the training data, and the predictions of the individual models are combined to make a final prediction. Bagging may average the base classifiers' predictions, and may thus provide non-optimized overall predictions. Boosting is a type of ensemble method in which a model is trained on a dataset in a series of rounds, and the errors made by the model in each round are used to weight the examples in the training set for the next round. This process continues until the model reaches a satisfactory level of performance. Examples of boosting algorithms include AdaBoost and gradient boosting. Stacking is a type of ensemble method in which a second-level model is trained to combine the predictions of multiple base models. The base models can be trained using any method, and the second-level model can be trained using supervised learning techniques. Mixture of Experts (ME) is a type of ensemble method in which a model is trained to combine the predictions of multiple specialized base models. The base models are trained to make predictions on different subsets of the data, and the ME model is trained to determine which base model is most appropriate for a given input. ME algorithms may provide a number of advantages for implementing the present subject matter, for example, ME algorithms can preserve the performance of individual base classifiers.

A typical architecture of ME models may comprise a set of base classifiers, a gating model, and a pooling model. Base classifiers are trained on a subset of the data for a specific task as described above, in order to specialize in certain types of tasks or patterns. A gating model decides what base classifiers' predictions should be considered in calculating the final output. The gating model is responsible for determining which base classifier is most appropriate for a given input, based on the characteristics of the input and the capabilities of the base classifiers. The pooling model combines the predictions of the selected base classifiers in a designated way (e.g., by taking a weighted average) in order to make the final prediction.

While various gating models and pooling models are optionally used on top of the proposed base classifiers, the subject matter described herein also includes a specific implementation of those two components as follows:

Gating model: In some embodiments, a Multi-Layer Perceptron (MLP) model can be used as a gating model in a Mixture of Experts (ME) model in order to decide which base classifiers to use for a given input. The inputs to the gating model might include information about the quality of the different input data types (e.g., whether the textual metadata is more informative than the time series data) and the similarity of the input data to the training data of the base classifiers (e.g., whether the input data contains keywords that were observed more frequently in the training data of a particular base classifier). In some embodiments, the gating model can use this information to decide which base classifiers are most likely to make accurate predictions for a given input, and it can then pass the input on to the selected base classifiers for further processing. The predictions of the selected base classifiers can then be combined by the pooling model to make the final prediction for the input. As such, the gating model may facilitate directing the flow of information through the ME model and determining which base classifiers are used to make predictions for a given input.

Pooling model: A Multi-Layer Perceptron (MLP) model can be used as a pooling model in a Mixture of Experts (ME) model in order to combine the predictions of the base classifiers. The pooling model can be trained to perform a weighted average of the predictions of the base classifiers, based on the outputs of the gating model. The gating model can provide weights that reflect the relative importance or confidence of the predictions of the different base classifiers, and the pooling model can use these weights to calculate the final prediction for the input. In some cases, the system may use a linear activation function in the pooling model in order to preserve the gated outputs of the base classifiers while still providing weights on the results. Using a linear function as the activation function for the MLP model would allow the gated outputs of the base classifiers to be preserved while still allowing the MLP to assign different weights to them. This can help to ensure that the final prediction is a weighted average of the predictions of the base classifiers, rather than being transformed in some other way that might alter the relative importance of the individual predictions. As such, the pooling model may facilitate combining the predictions of the base classifiers and producing the final prediction for the input.

Figure 2:
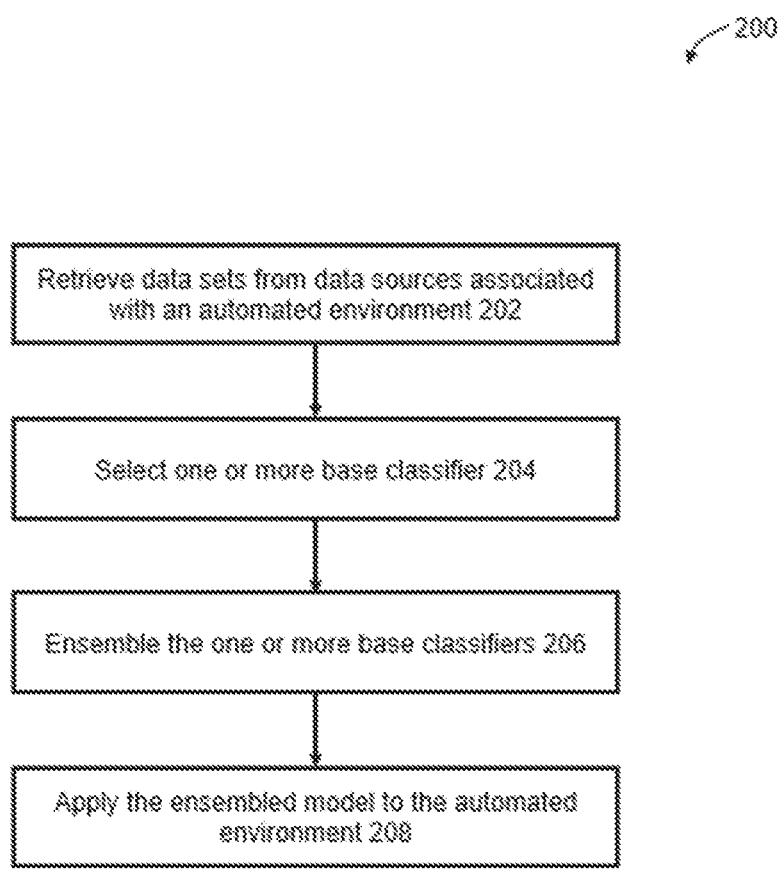
FIG. 2 shows a non-limiting example of a process for ensembling base classifiers into a model to generate a semantic arrangement for input data sets, in accordance with embodiments described herein.

FIG. 2 shows a non-limiting example of a process 200 for ensembling base classifiers into a model to generate a semantic arrangement for input data sets, in accordance with embodiments described herein. The process 200 may being with operation 202, wherein the system may retrieve data sets from data sources associated with an automated environment. In some embodiments, the data sets may comprise a plurality of metadata. In some embodiments, the system may parse the received data sets for metadata.

Next, the process 200 may proceed to operation 204, wherein the system may select one or more base classier. In some embodiments, the system may utilize a gating model to make the selection. In some embodiments, the gating model may comprise a decision tree, neural network-based gating models, or rule-based gating models, etc. In some embodiments, the gating model may decide which base classifiers are most likely to make accurate predictions for a given input, and it can then pass the input on to the selected base classifiers for further processing. For example, the gating model may be a MLP model, and may be trained by training sets comprising examples of inputs and the corresponding base classifier that should be chosen for each input. In some embodiments, this dataset to train the MLP model may use techniques such as backpropagation and gradient descent. In some embodiments, the MLP gating model may be fine-tuned by adjusting the hyperparameters (e.g., the number of hidden layers and the learning rate).

In some embodiments, the MLP gating model may be trained based on the similarity of metadata. For example, the MLP gating model may trained on examples of input metadata and the corresponding base classifier that should be chosen for each input. In some embodiments, techniques such as string similarity measures (e.g., edit distance) or embedding techniques (e.g., doc2vec) may be utilized to calculate the similarity between the input metadata and the training data of the base classifiers.

In some embodiments, the MLP gating model may be trained based on the quality of the different input data types, e.g., the textual metadata is more informative than the time series data in a particular setting. For example, the MLP gating model may be trained on examples of input data and the corresponding base classifier that should be chosen for each input. Techniques such as manual labeling or automatic feature extraction may be utilized to determine the quality of the input data. For example, NLP techniques may be utilized to extract keywords from the textual metadata and use these keywords as features to predict which base classifier should be used. Additionally or alternatively, features from the time series data may be extracted, such as statistical measures or patterns in the data. In some embodiments, this dataset is fed to and train the MLP gating model using techniques such as backpropagation and gradient descent. The trained MLP gating model may predict which set of input data is more informative in the particular setting based on the quality of the input data.

The trained MLP gating model may be utilized, in operation 204, to select one or more base classifiers from a plurality of base classifier for the input data. The gating model can use the input data to decide which base classifiers are most likely to make accurate predictions for a given input, and it can then pass the input on to the selected base classifiers for further processing.

Next, the process 200 may proceed to operation 206, wherein the system may ensemble the one or more gate classifiers. In some embodiments, the system may utilize a pooling model to ensemble the gate classifiers. In some embodiments, the pooling model can be trained to perform a weighted average of the predictions of the base classifiers, based on the outputs of the gating model. In some embodiments, the pooling model can use the outputs of the gating model to determine the weights that should be applied to the predictions of the different base classifiers when calculating the final prediction. For example, if the gating model determines that a particular base classifier is more likely to provide accurate predictions for a given input, the pooling model might give that base classifier a higher weight when calculating the final prediction. In some embodiments, the gating model can use various factors, such as the quality of the input data and the similarity of the input data to the training data of the base classifiers, to determine the weights that should be applied to the predictions of the different base classifiers. In some embodiment, the pooling model can then use these weights to calculate the final prediction by taking a weighted average of the predictions of the base classifiers. For example, if three base classifiers have been selected by the gating model, and have made predictions on a particular input, and the gating model has provided the following weights for these classifiers: 0.3, 0.5, and 0.2. Assuming, in this example, Classifier 1's prediction=0.8; Classifier 2's prediction=0.6; and Classifier 3's prediction=0.9. To calculate the final prediction using a weighted average, the formula may multiply each classifier's prediction by its weight and then sum these values, for example: (0.3*0.8)+ (0.5*0.6)+(0.2*0.9)=0.24+0.3+0.18=0.72. Therefore, the final prediction would be 0.72. In some embodiments, the weight is provided by the pooling model, the gating model, and/or a combination of the gating model and the pooling model. This operation may provide the advantages that may allow the final prediction to be more accurately tailored to the specific characteristics of the input data and the capabilities of the base classifiers.

In some embodiments, the pooling model may be a MLP pooling model. In some embodiments, the MLP pooling model is trained on a set of input data and corresponding target output values, as well as a set of base classifier predictions for each input. In some embodiments, the outputs of the gating model may provide the weights that the pooling model should use to combine the predictions of the base classifiers. In some embodiments, these inputs and outputs may be utilized to train the MLP pooling model using standard machine learning techniques, such as backpropagation and gradient descent. In some embodiments, the training process for the MLP pooling model may also comprise adjusting the weights and biases of the MLP model to minimize the error between the predicted outputs and the target outputs.

In some cases, the system may use a linear activation function in the pooling model in order to preserve the gated outputs of the base classifiers while still providing weights on the results. Using a linear function as the activation function for the MLP model would allow the gated outputs of the base classifiers to be preserved while still allowing the MLP to assign different weights to them. As such, the final prediction may be a weighted average of the predictions of the base classifiers, rather than being transformed in some other way that might alter the relative importance of the individual predictions. In some embodiments, the pooling model may facilitate combining the predictions of the base classifiers and producing the final prediction for the input.

Next, the process 200 may proceed to operation 208, wherein the system may apply the ensembled model to the automated environment. In some embodiment, the ensembled model may generate a semantic arrangement or a semantic map for the automated environment. In some embodiments, applying the ensembled model to the data from the automated environment may facilitate the system to make predictions about the semantics of the data. For example, the ensembled model may predict the type and location of various sensors in the environment, or it may predict the relationships between different data points or devices. The resulting semantic arrangement or map can provide a more structured and organized view of the data in the automated environment, which can be useful for various applications such as building management, energy efficiency optimization, and maintenance planning.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premises systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. The network 130 may comprise ethernet, IP, serial buses, and other forms of communication between two or more IoT devices. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus, or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDERBOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, building information, classifier information, and semantic information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Examples

The following illustrative example is representative of embodiments of the software applications, systems, media, and methods described herein and are not meant to be limiting in any way.

Exemplary Use Case

Smart buildings have much potential to improve energy efficiency and the quality of life by applying computation logic to the systems. In order to apply computation logic (e.g., computer programs) to the systems in a smart building, it is necessary to understand the semantics of data that is being collected by the building's sensors. This includes understanding the type of sensors that are being used (e.g., temperature sensors, humidity sensors, etc.) and the location of the sensors within the building (e.g., in Room 101). Knowing this information is important because it allows the computer programs that are being used to control the building's systems to make sense of the data that is being collected and to use it in a meaningful way. For example, if a program knows that a particular sensor is a temperature sensor and that it is located in a particular room, it can use the data from that sensor to control the heating or cooling in that room to maintain a comfortable temperature.

However, extracting the semantics of data in buildings can be a challenging task due to the complexity and diversity of the data sources. Building data can come from a variety of sources, including sensors, control systems, and other IoT devices. The data may be structured (e.g., in a database) or unstructured (e.g., in the form of text metadata). Additionally, the data may be time-series data (i.e., data that is collected over time) or static data (i.e., data that does not change over time). This diversity of data sources and types can make it difficult to develop a machine learning model that is able to extract the semantics of the data in a building.

In order to overcome these challenges, the present subject matter employs an ensemble approach to extracting the semantics of data in buildings. An ensemble approach involves using a combination of multiple machine learning models, rather than relying on a single model. By using multiple models, the ensemble approach is able to capture a wider range of patterns in the data, which can improve the accuracy of the semantics extraction. Additionally, the ensemble approach allows for the use of different types of models for different types of data, which can further improve the accuracy of the semantics extraction.

In one embodiment, the ensemble approach involves training multiple base classifiers on different subsets of the data. For example, one base classifier may be trained on time-series data from temperature sensors, while another base classifier may be trained on static data from control systems. Each base classifier is specialized in a particular type of data and is able to extract the semantics of that data more accurately than a single, holistic model would be able to.

When the input data from a number of IoT devices associated with a building is received, the system of present disclosure may identify one or more base classifiers using a gating model. The IoT devices may comprise, for example, assembly line with sensors, actuators, and effectors, lighting systems, HVAC systems with temperature sensors, etc. The gating model may decide which base classifiers' predictions should be considered in calculating the final output based on the quality of the different input data types (e.g., whether the textual metadata is more informative than the time series data) and the similarity of the input data to the base classifiers' training data (e.g., whether the input data contains keywords that were observed more frequently in the training data of a particular base classifier). The pooling model may then combine the gated results from the base classifiers in a designated way, such as by taking a weighted average, in order to make the final prediction for the input data. the final prediction may comprise a semantic map, which may be a representation of the meaning of the data collected by the building's sensors. The semantic map may include information about the types of sensors that are being used, the locations of the sensors within the building, and the relationships between the sensors (e.g., which sensors are connected to which systems or devices). The semantic map may also include information about the data itself, such as the units of measurement being used, the range of values that the data can take on, and any other relevant metadata. By understanding the semantics of the data being collected, it is possible to apply computation logic to the systems in the building in order to optimize their operation and improve energy efficiency and the quality of life. The use of an ensembled model to generate the semantic map can allow for more accurate and comprehensive understanding of the data, as it can incorporate the strengths of multiple models trained on different types of data.

This semantic map can then be used to control the systems in the building, such as the heating and cooling systems, in order to improve energy efficiency and the quality of life. For example, if the semantic map indicates that a particular sensor is a temperature sensor and that it is located in a particular room, the computer program controlling the building's systems can use the data from that sensor to adjust the temperature in that room to maintain a comfortable level. The semantic map can also be used to identify any potential issues or problems with the building's systems, such as a malfunctioning sensor or a malfunctioning HVAC system, and to alert the appropriate personnel to address the issue. Overall, the semantic map generated by the ensembled model can be used to improve the efficiency and operation of the building by allowing the building's systems to be controlled more intelligently and effectively.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
a) retrieving a plurality of data sets from a plurality of electronically controllable equipment associated with an automated environment, wherein the plurality of data sets comprises a plurality of metadata;
b) creating a training set comprising (i) a plurality of data sets from a plurality of electronically controllable equipment associated with a second automated environment other than said automated environment, and (ii) a label that indicates a semantic arrangement associated with each of the plurality of electronically controllable equipment associated with the second automated environment;
c) training an ensembling machine learning model with the training set;
d) selecting one or more base classifiers from the plurality of base classifiers based at least in part on a similarity level between metadata associated with the one or more base classifiers and the plurality of metadata associated with the plurality of data sets;
e) ensembling the one or more base classifiers with the ensembling machine learning model to assign one or more weights to the one or more base classifiers based at least in part on the similarity level;
f) applying the ensembled machine learning model to the automated environment to generate a semantic map indicative of semantic arrangement of the plurality of electronically controllable equipment associated with the automated environment; and g) displaying the semantic map.

2. The method of claim 1, wherein (e) further comprises:
(e1) utilizing a Multi-Layer Perceptron (MLP) model to identify quality level of the plurality of data sets; and
(e2) assigning one or more weights to the one or more base classifies based at least in part on the similarity level and the quality level.

3. The method of claim 1, wherein the automated environment comprises a building, a warehouse, a factory, or a campus.

4. The method of claim 1, wherein the plurality of electronically controllable equipment comprises Internet of Things (IoT) devices.

5. The method of claim 1, wherein (b) further comprises:
(b1) creating a gating model training set comprising (i) a plurality of data sets comprises a first set of metadata, and (ii) a label that indicates which of the one or more base classifiers are selected for the data sets; and
(b2) applying the gating model to the plurality of data sets to select the one or more base classifiers.

6. The method of claim 1, wherein (e) further comprises utilizing a linear function to ensemble the selected one or more base classifiers.

7. The method of claim 1, wherein the training set further comprises NLP-generated semantic maps.

8. The method of claim 1, wherein the similarity level comprises a string similarity.

9. The method of claim 1, wherein the training set is normalized.

10. The method of claim 1, wherein the training set comprises data sets associated with two or more different types of automated environments.

11. A system comprising at least one computing device comprising at least one processor, a memory, and instructions executable by the at least one processor to provide an application comprising:
a) a data retrieving module retrieving a plurality of data sets from a plurality of electronically controllable equipment associated with an automated environment, wherein the plurality of data sets comprises a plurality of metadata;
b) a base classifiers selection module creating a training set comprising (i) a plurality of data sets from a plurality of electronically controllable equipment associated with a second automated environment other than said automated environment, and (ii) a label that indicates a semantic arrangement associated with each of the plurality of electronically controllable equipment associated with the second automated environment;
c) a training module training an ensembling machine learning model with the training set;
d) a classifying module selecting one or more base classifiers from the plurality of base classifiers based at least in part on a similarity level between metadata associated with the one or more base classifiers and the plurality of metadata associated with the plurality of data sets;
e) a model ensemble module ensembling the one or more base classifiers with the ensembling model to assign one or more weights to the one or more base classifiers based at least in part on the similarity level;
f) a semantic generation module applying the ensembled learning model to the automated environment to generate a semantic map indicative of semantic arrangement of the plurality of electronically controllable equipment associated with the automated environment; and
g) an output module displaying the semantic map.

12. The system of claim 11, wherein the model ensemble module is further:
utilizes a Multi-Layer Perceptron (MLP) model to identify quality level of the plurality of data sets; and
assigns one or more weights to the one or more base classifies based at least in part on the similarity level and the quality level.

13. The system of claim 11, wherein the automated environment comprises a building, a warehouse, a factory, or a campus.

14. The system of claim 11, wherein the plurality of electronically controllable equipment comprises Internet of Things (IoT) devices.

15. The system of claim 11, wherein the base classifiers selection module further:
creates a gating model training set comprising (i) a plurality of data sets comprises a first set of metadata, and (ii) a label that indicates which of the one or more base classifiers are selected for the data sets; and
applies the gating model to the plurality of data sets to select the one or more base classifiers.

16. The system of claim 11, wherein the model ensemble module further utilizes a linear function to ensemble the selected one or more base classifiers.

17. The system of claim 11, wherein the training set further comprises NLP-generated semantic maps.

18. The system of claim 11, wherein the similarity level comprises a string similarity.

19. The system of claim 11, wherein the training set is normalized.

20. The system of claim 11, wherein the training set comprises data sets associated with two or more different types of automated environments.

* * * * *